US006999831B2

(12) United States Patent
Hayashi

(10) Patent No.: US 6,999,831 B2
(45) Date of Patent: Feb. 14, 2006

(54) METHOD OF MANAGING MANUFACTURING PROCESS

(75) Inventor: Shunji Hayashi, Miyazaki-ken (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/959,348

(22) Filed: Oct. 7, 2004

(65) Prior Publication Data

US 2005/0228524 A1 Oct. 13, 2005

(30) Foreign Application Priority Data

Apr. 12, 2004 (JP) .............................. 2004-116501

(51) Int. Cl.
*G06F 19/00* (2006.01)

(52) U.S. Cl. ........................................ 700/101; 700/96

(58) Field of Classification Search ................ 700/101, 700/96, 121

See application file for complete search history.

(56) References Cited

U.S. PATENT DOCUMENTS

| | | | | |
|---|---|---|---|---|
| 5,815,400 | A * | 9/1998 | Hirai et al. | 700/173 |
| 5,818,716 | A | 10/1998 | Chin et al. | |
| 6,360,133 | B1 | 3/2002 | Campbell et al. | |
| 6,445,968 | B1 * | 9/2002 | Jalla | 700/101 |
| 6,490,494 | B1 * | 12/2002 | Yasuda | 700/101 |
| 6,519,498 | B1 * | 2/2003 | Jevtic et al. | 700/101 |
| 6,529,789 | B1 | 3/2003 | Campbell et al. | |
| 6,606,530 | B1 * | 8/2003 | Brouwers | 700/101 |
| 6,671,570 | B1 * | 12/2003 | Schulze | 700/121 |
| 6,856,848 | B1 * | 2/2005 | Matsumoto et al. | 700/101 |
| 2003/0033093 | A1 * | 2/2003 | Nelson | 702/34 |
| 2004/0030428 | A1 * | 2/2004 | Crampton et al. | 700/101 |
| 2005/0034812 | A1 * | 2/2005 | Roche et al. | 156/345.28 |

FOREIGN PATENT DOCUMENTS

| | | |
|---|---|---|
| JP | 10-041204 | 2/1998 |
| JP | 2001-273023 | 10/2001 |
| JP | 2002-073148 | 3/2002 |

OTHER PUBLICATIONS

"An Approach for Generalizing Knowledge Based on Rules with Priority Orders"-An et al, South China University, IEEE, 2004.*

"An Algorithm for Scheduling Prioritized Tasks in a Hard Real-Time Environment"-Etkin et al, GTE Laboratories, IEEE, 1996.*

* cited by examiner

*Primary Examiner*—Leo Picard
*Assistant Examiner*—Michael D. Masinick
(74) *Attorney, Agent, or Firm*—Takeuchi & Kubotera, LLP

(57) ABSTRACT

A priority number of each combination of a manufacturing device and a step are first calculated by the equation=processing time×number of processible steps×number of usable devices. From the combination having the smallest priority number (i.e. highest priority), a lot will be allotted to the device for the step. The priority number is updated every after allotment of one lot by the equation=processing time×number of processible steps×number of usable devices×$\{(\text{device load}\times 10)^k+1\}$. By repeating this procedure, all the lots scheduled to be processed are allotted to the corresponding devices. In addition, in the actual manufacturing process, whenever there is a lot that has to be processed, execution of processing such a lot is directed by successively selecting a device having the lowest accomplishment rate.

4 Claims, 2 Drawing Sheets

METHOD OF MANAGING MANUFACTURING PROCESS

BACKGROUND TECHNOLOGY

The present invention relates to a method of managing a manufacturing process, such as a dispatch (priority process) for manufacturing a semiconductor device.

Patent Reference 1: Japan Unexamined Patent Application Publication No. H10-41204

Patent Reference 2: Japan Unexamined Patent Application Publication No. 2001-273023

Patent Reference 3: Japan Unexamined Patent Application Publication No. 2002-73148

The above-listed patent reference 1 discloses a manufacturing process managing system comprising a memory to register items in process for sorting them by the product type, a memory to register manufacturing devices to process the items in process for sorting them by device group of each manufacturing step, and CPU to compute the load sharing rate of those manufacturing devices.

In this manufacturing process managing system, the load sharing rate of each manufacturing device is calculated based on two assumptions. The first assumption is that the operating rate of a manufacturing device defined by the number of products scheduled to be manufactured in a unit period, the operable time of a manufacturing device in a unit period, the processing time to process items in process in a unit period, and the load sharing rate of each manufacturing device is equal to the operating rate of other manufacturing device. The second assumption is that the summation of the load sharing rates of manufacturing devices in a manufacturing device group is 1, in order to evenly allot loads to each manufacturing device. Therefore, several types of products can be manufactured fully using existing manufacturing equipment.

The patent reference 2 discloses a production managing method, whereby the manufacturing schedule can be made such that the usage rate of each manufacturing device by each step is constant during the operation period in mid-term production planning, when a group of manufacturing devices are commonly used by a group of steps.

In this production managing method, the ratio of accumulated scheduled production to accumulated capable production in the whole operating period of the mid-term production planning is calculated as the operating rate for each step. Then, the optimum usage ratio of each device is calculated such that the operating rates are equal among the steps in the group. Therefore, the calculated optimum usage ratio can reflect the short-term production planning.

The patent reference 3 discloses a production managing instrument for determining the processing number among a plurality of lots. When there are a plurality of lots to produce each product, this instrument first determines the device load ratio of each manufacturing device, which is a measure of load of the device used to process each lot, then determines the load ratio priority according to the device load ratio, and then determines the processing order by integrating the load ratio priority with another priority determined by other factor that determines a processing lot unit. Therefore, the decrease of processing ability of device due to a trouble is considered, and lowering the efficiency of the production line can be minimized.

However, many conventional manufacturing process managing systems or similar systems are designed so as to determine the priority number for processing based on the operating condition of the manufacturing device or the condition of items in process, or designed to simply process overdue items preferentially. Therefore, the operating rate of the manufacturing device is not dramatically improved, and the manufacturing time is not satisfactorily shortened.

SUMMARY OF THE INVENTION

Accordingly, it is an object of this invention to provide a manufacturing process managing method, whereby the operating rate of manufacturing equipment can be improved and the manufacturing time can be shortened.

The present invention relates to a manufacturing process managing method for performing manufacturing steps by successively selecting a device having highest priority from a plurality of manufacturing devices that can process at least one step. In the method of this invention, the following steps are performed. First, a first step is performed for calculating the processing time required for processing one lot by each step that can process the lot with each manufacturing device. Then, a second step is performed for calculating the number of steps that can be processed with each manufacturing device and the number of usable devices, which is the number of devices that can be used by each step. Thereafter, a third step is performed for calculating priority number for each combination of a manufacturing device and a step based on the processing time, the number of processible steps and the number of usable devices.

Next, according to the number of lots that are scheduled to be processed in a specified period of time by each step, a fourth step is performed for allotting one lot to a manufacturing device having the highest priority in the most updated priority order. Then, a fifth step is performed for calculating the device load of the manufacturing device, to which a lot to be processed is allotted in the fourth step. Thereafter, a sixth step is performed for updating the most updated priority order by correcting the priority number using the device load calculated in the fifth step. Then, a seventh step is performed for determining the number of lots to be processed by each combination of a manufacturing device and a step.

If there is a lot that can be processed by one of the steps, an eighth step is performed for directing an execution of the step to process the lot after selecting a manufacturing device that has the lowest accomplishment rate, which is a ratio of the number of lots processed with the device by the corresponding step to the number of lots scheduled to be processed with the device by the step.

In this invention, the priority number is calculated based on the processing time, the number of steps that can be processed and the number of usable devices for each combination of a manufacturing device and a step that can be processed with corresponding device. Then, based on the number of lots that are scheduled to be processed by each step, while one lot is allotted to the manufacturing device having the highest priority, the most updated priority order is further updated by correcting the corresponding device load. After repeating this procedure, all the lots to be processed are allotted to corresponding manufacturing devices. Moreover, when there is a lot that can be processed by one of the steps, a device having the smallest accomplishment rate, which is a ratio of the number of processed lots to the number of lots to be processed by the step that can be processed with the device, is selected, and then execution of processing the lot is directed. According to this procedure, the operating rate can be improved, and the manufacturing time can be shortened.

BEST MODE FOR CARRYING OUT THE INVENTION

The initial priority number is calculated by multiplying the processing time×the number of processible steps×the number of usable device, and one of lots to be processed is allotted to a device having the highest priority, i.e. the smallest priority number. Then, whenever a lot is allotted to a device, the priority number is updated by newly calculating the most updated priority number by multiplying the processing time×the number of processible steps×the number of usable devices×$\{10^{k'\times(device\ load-0.9)}\times 10+1\}$. By repeating this procedure, all the lots to be processed in a certain period of time are allotted to corresponding manufacturing device.

Furthermore, in the actual manufacturing process, whenever there is a lot that can be processed by one of the steps, a device having the smallest accomplishment rate is successively selected, and then execution of processing the lot is directed.

The above and another objectives and novel features of this invention will become more apparent by describing in detail preferred embodiments thereof with reference to the annexed drawings. It will of course be appreciated that the drawings are provided for explanation, and not for limiting the scope of this invention.

Embodiment 1

A manufacturing process is managed in order to perform a precise manufacturing process by connecting a computer having MES (Manufacturing Execution System) with a manufacturing device included in the production line, a carrier device, such as AGV (Automatic Guided Vehicle), and a terminal device via communication line such as LAN (Local Area Network), intensively managing information such as processing condition inputted from a manufacturing device or the like, and transmitting dispatch information of processing products to a manufacturing device or the like.

The manufacturing process management in this invention is comprised of manufacturing schedule management and manufacturing execution management. The manufacturing schedule management is for allotting the number of lots scheduled to be processed in a certain period of time to each manufacturing device in advance according to the processing ability of each device that can process at least one step. The manufacturing execution management is for actually allotting execution of processing a lot to a device according to a request for processing items in process that successively occurred.

Figure 1:
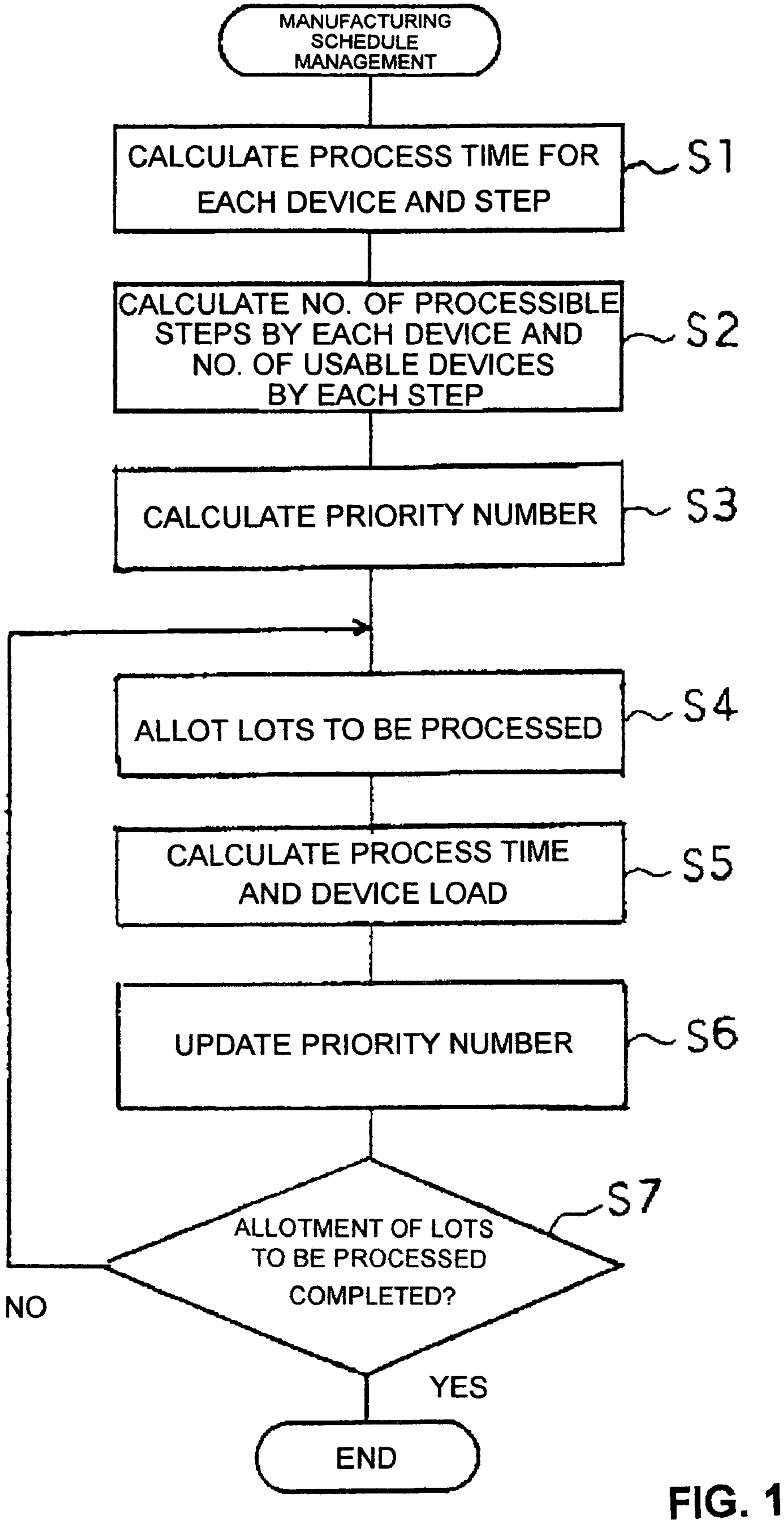
FIG. 1 is a flowchart of a manufacturing process management according to the embodiment of this invention.
Figure 1:
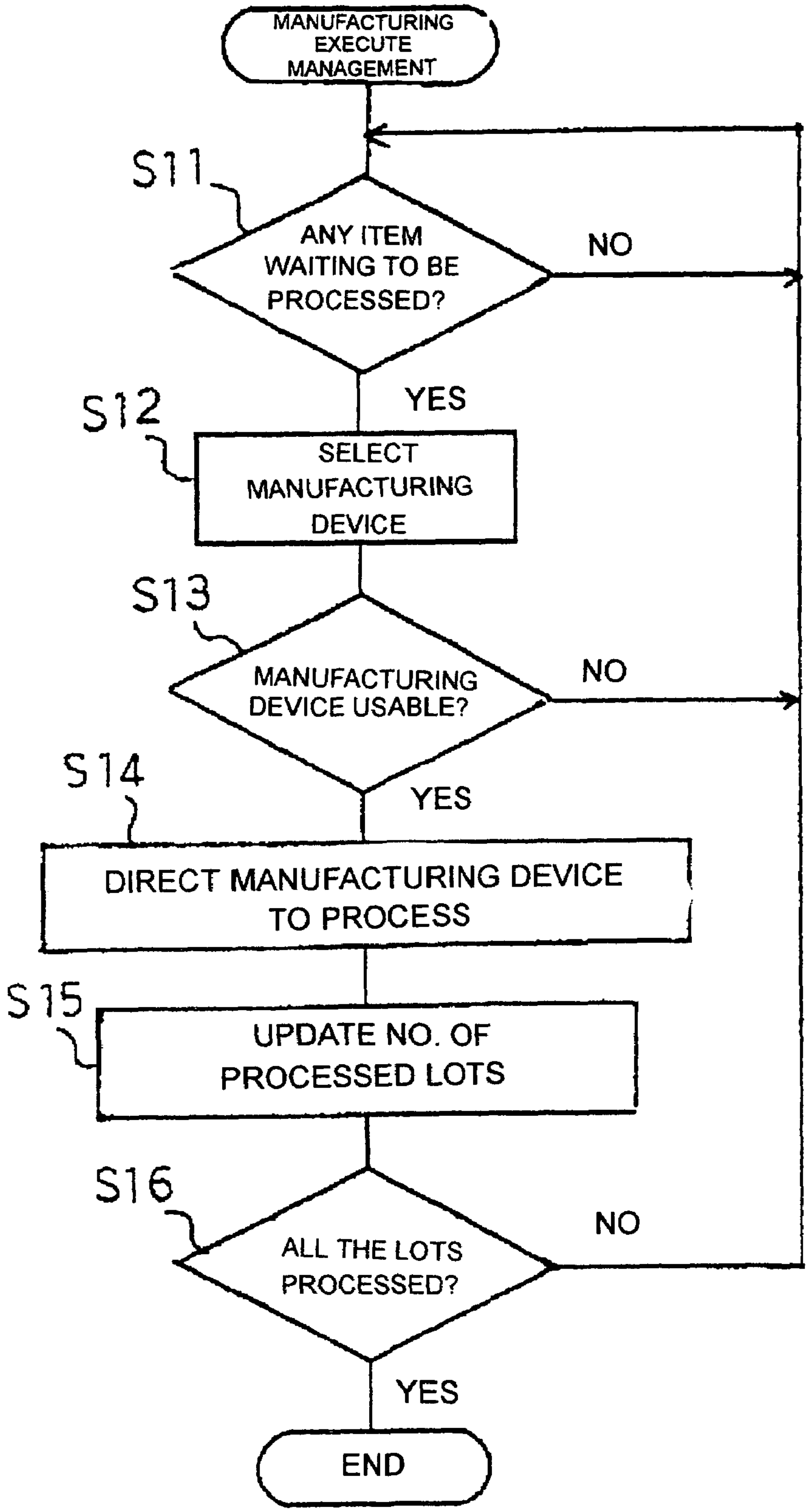

FIG. 1 is a flowchart of manufacturing process management, which is an embodiment of this invention. The manufacturing step managing method of this embodiment will be described below by individually describing: (1) the manufacturing schedule management; and (2) the manufacturing execution management, referring to the tables shown below as necessary.

(1) Manufacturing Schedule Management

First, in Step S1, a step for calculating processing time is performed for each combination of a device and a step. This process is for extracting a step that can be processed with each manufacturing device, and then calculating the average value of time required to process one lot by the step. This process is usually performed using a database of past processing results accumulated in MES. However, since there is no past result available for newly introduced manufacturing device, estimated value is used. Table 1 shows an example of a database of processing results. Here, for simple description, four devices (devices 1–4) and four steps (steps A–D) are employed in this example.

TABLE 1

Database of Processing Results

| Device | Step | Processing Time |
|---|---|---|
| 1 | A | 1.6 |
| 2 | A | 0.8 |
| 1 | D | 0.6 |
| 3 | D | 1.1 |
| 4 | A | 1.1 |
| 2 | B | 1.0 |
| 3 | D | 1.3 |
| 2 | D | 0.8 |
| . | . | . |
| . | . | . |
| . | . | . |

In Step S2, a step for calculating the number of steps processible by each device and the number of usable devices in each step is performed. The number of steps processible by each device (number of processible steps) is the number of steps that can be processed with each manufacturing device. The number of usable devices in each step (number of usable devices) is the number of manufacturing devices that can be used to process each step. Table 2 shows the processing time for each combination of a device and a step, which is calculated in Step S1, and the number of processible steps and the number of usable devices which are calculated in Step S2. According to this Table, for example, when the step C is performed with the device 2, it takes 1.7 hours to process one lot. In addition, the number of processible steps for the device 2 is 4 (i.e., steps A–D), and the number of usable devices for the step C is 2 (i.e., devices 2 and 4). Here, "N/A" in Table 2 (e.g. the processing time for the device 1 and the step B) means that the step can not be processed with the corresponding manufacturing device.

TABLE 2

Processing Time for Each Device and Step

| Device\Step | A | B | C | D | Processible Steps |
|---|---|---|---|---|---|
| 1 | 1.6 | N/A | N/A | 0.6 | 2 |
| 2 | 0.8 | 1.0 | 1.7 | 0.8 | 4 |
| 3 | N/A | | N/A | 1.2 | 1 |
| 4 | 1.1 | N/A | 1.9 | N/A | 2 |
| Usable Devices | 3 | 1 | 2 | 3 | |

In Step S3, a step for calculating the priority number (initial value) is performed. This is for calculating the initial value of priority number for each combination of a processible manufacturing device and a step., using the following equation, Eq. 1, $$\text{Priority Number (Initial Value)} = \text{Processing Time} \times \text{Number of Usable Devices} \times \text{Number of Processible Steps} \quad \text{(Eq. 1)}$$

This priority number can be calculated using the values in Table 2. For example, the priority number when the step A is processed with the device 1, the time required for performing the step A with the device 1 is 1.6 hours, the number of usable devices for the step A is 3, and the number of processible steps by the device 1 is 2, so that the priority number can be obtained as 9.6 by multiplying those three values.

Table 3 shows the initial values of priority numbers calculated in Step S3.

TABLE 3

| Priority Numbers (Initial Value) | | | | |
|---|---|---|---|---|
| Device\Step | A | B | C | D |
| 1 | 9.6 | N/A | N/A | 3.6 |
| 2 | 9.6 | 4.0 | 13.6 | 9.6 |
| 3 | N/A | N/A | N/A | 3.6 |
| 4 | 6.6 | N/A | 7.6 | N/A |

A smaller priority number calculated by Eq. 1 indicates a higher priority. The first reason of this is that total processing time can be shortened by preferentially using a device having shorter processing time. The second reason is that a lot is preferentially allotted to a device having the smallest number of processible steps in order to make later allotment easier. In other words, the priority order in Eq. 1 is determined based on a conception that the whole waiting time can be reduced and the operating rate of equipment can be improved by allotting lots to a device having more flexibility in allotment and leaving more lots to be possibly allotted to a device that can be used for many purposes and has more flexibility in allotment.

Next, a step for allotting lots scheduled to be processed to each combination of a device and a step is performed by repeating the processes of Steps S4–S7, which are described below, for each one lot according to the estimated number of lots to be processed by each step in a specified period of time (e.g. a day, a week, or a month). This process is for allotting the planned number of lots to be processed to each device for each step. Here, the numbers of lots scheduled to be processed by the step A, B, C and D in a day are 15, 12, 8 and 11, respectively.

In Step S4, a combination of a device and a step which has the highest priority is searched, and one of lots scheduled to be processed is allotted to the retrieved combination of a step and a device. For example, in the allotment of the first lot, as shown in Table 3, the priority numbers of the combinations of device 1 and step D and the device 3 and step D are both 3.6, which is the lowest value in the table. In this case, the first one lot will be allotted to the device 3 that has a smaller number of processible devices, but there is no significant difference even if it is allotted to the device 1. In this case, as shown in Table 4 which shows the allotment of lots, the number of lots allotted to the combination of the device and the step D is 1. Here, in Table 4, the top row shows the number of lots scheduled to be processed by each step, the bottom row shows the number of lots already processed by each step.

TABLE 4

| Allotment of Lots | | | | |
|---|---|---|---|---|
| | Lots to be Processed | | | |
| | 15 | 12 | 8 | 11 |
| Device\Step | A | B | C | D |
| 1 | 0 | N/A | N/A | 0 |
| 2 | 0 | 0 | 0 | 0 |
| 3 | N/A | N/A | N/A | 1 |
| 4 | 0 | N/A | 0 | N/A |
| Lots Allotted | 0 | 0 | 0 | 1 |

In Step S5, based on the result of the lot allotment in Step S4, the assigned processing time and the device load are calculated for each manufacturing device. The reserved processing time of each manufacturing device is calculated by multiplying the number of allotted lots shown in Table 4 and the average time to process one lot by the combination of the device and the step, which is shown in Table 2. In addition, the device load of each manufacturing device is calculated by dividing the total assigned processing time of each manufacturing device in each step by the unit operable time of the manufacturing device. Here, the operable time is for setting the maximum operable time of the device in a unit period of time (in this case, one day). Table 5 shows the reserved processing time when the first one lot is allotted.

TABLE 5

| Reserved Processing Time | | | | | | | |
|---|---|---|---|---|---|---|---|
| Device\Step | A | B | C | D | Total Time | Operable Time | Device Load |
| 1 | 0 | N/A | N/A | 0 | 0 | 21.3 | 0 |
| 2 | 0 | 0 | 0 | 0 | 0 | 22.8 | 0 |
| 3 | N/A | N/A | N/A | 1.2 | 1.2 | 20.4 | 0.06 |
| 4 | 0 | N/A | 0 | N/A | 0 | 21.6 | 0 |

In the Step S6, following the allotment of reserved lots, a process for updating the priority number, is performed. This process is for recalculating the priority number with the following equation, Eq. 2, considering the device load calculated in Step S5.

$$\text{Priority Number (Updated Value)} = \text{Priority Number (Initial Value)} \times \{((\text{Device Load}) \times 10)^k + 1\} \quad \text{(Eq. 2)}$$

where, the exponent k is a constant and can be 5 for example.

Here, the exponent k is not limited to 5, but can be any, for example, any number between 1 and 10. In addition, Eqs. 1 and 2 do not seem correlated, but since the device load is 0 for the initial value of priority number, those equations can be considered correlated. Therefore, Eq. 3 shown below can be used in place of the above-described Eqs. 1 and 2. In other words, an equation in which the priority number properly increases as the device load increases should be used.

$$\text{Priority Number} = \text{Processing Time} \times \text{Number of Usable Devices} \times \text{Number of Processible Steps} \times \{(\text{Device Load}) \times 10\}^k + 1\} \quad (3)$$

The priority number (initial value) in Table 3 is updated by the priority number recalculated by Eq. 2. Table 6 shows the priority number (updated value) which is updated after the first one lot is allotted.

TABLE 6

Updated Priority Numbers

| Device\Step | A | B | C | D |
|---|---|---|---|---|
| 1 | 9.6 | N/A | N/A | 3.6 |
| 2 | 9.6 | 4.0 | 13.6 | 9.6 |
| 3 | N/A | N/A | N/A | 5.9 |
| 4 | 6.6 | N/A | 7.6 | N/A |

As shown in Table 6; the value of the priority number for the combination of the device 3 and step C is increased in comparison with the initial value, which indicates the priority number is lowered. After completing the process of Step S6, it is determined if allotment of all the lots scheduled to be processed is completed in Step S7. If there is still a lot not allotted, it returns to Step S4, and Steps S4–S7 are repeated. Of course, in this case, the priority number used in Step S4 is not the initial value, but the priority number updated in Step S6 (i.e. updated value shown in Table 6) is used. In addition, if the device load calculated in Step 5 exceeds 1, allotment of a lot to the device is not performed no matter what the value of the priority number is. However, if the load of all the devices exceeds 1, allotment of a lot is performed according to the priority number. Furthermore, even if the priority is high but there is no lot that is not allotted and needs the device for processing, allotment of a lot to the device for the step is not performed. Once allotment of all the lots is completed, the process of this manufacturing schedule management is completed.

According to the above procedures, a table of final allotment of lots can be obtained as in Table 7.

TABLE 7

Allotment of Lots

| Device\Step | A | B | C | D |
|---|---|---|---|---|
| 1 | 4 | N/A | N/A | 7 |
| 2 | 0 | 12 | 4 | 0 |
| 3 | N/A | N/A | N/A | 4 |
| 4 | 11 | N/A | 4 | N/A |
| Total | 15 | 12 | 8 | 11 |

(2) Manufacturing Execution Management

The manufacturing execution management is for executing dispatch of manufacturing devices to each lot of items in process using the final number of allotted lots (Table 7), which are allotted according to the processes of Steps S1–S7 in the manufacturing schedule management, and the number of lots processed by each combination of a device and a step.

The dispatch is done by controlling and processing steps performed by MES and respective manufacturing devices, which include a device for performing a manufacturing process and a carrier device for carrying items in process to the next manufacturing device, and by inputting data by the operator and outputting a direction to the operator using a terminal device.

For example, when the number of allotted lots, which is shown in Table 7, is the average number of lots in a day, it is ideal that all the number of lots scheduled to be processed by each device and step is 0 at the time of starting work on the day. However, as reality, it is difficult to accomplish the targeted number every day, so it is satisfactory as long as the targeted number is accomplished in a certain period, for example, in a month.

In Step S11 of FIG. 2, it is determined if there is any item in process (lot) waiting to be processed. If there is such an item, it proceeds to Step S12, if not, it stays at Step S11.

At Step S12, a process for selecting a manufacturing device to perform the process is done. If there are several items in process waiting to be processed, the one having the highest urgency (e.g. the degree overdue for delivery) among the items is processed for selection first.

In this selection process, the process accomplishment rate of the step is compared for each manufacturing device that is scheduled to process the step required to process the lots waiting to be processed. The process accomplishment rate is defined as a value indicating the ratio of the number of actually processed lots to the number of lots scheduled to be processed by each step allotted to each manufacturing device. As a result of comparison of the process accomplishment rates, from the manufacturing device having the smallest process accomplishment rate, the devices are successively selected as the first candidate, the second candidate, and so on.

For example, if there is a lot that needs to be processed by the step A when the number of processed lots is as shown in Table 8, the devices scheduled to perform the step A are the device 1 for 4 lots and the device 4 for 11 lots, as shown in Table 7. In addition, as shown in Table 8, the device 2 already processed 2 lots by the step A, and the device 4 processed 6 lots by the step A. Therefore, the process accomplishment rates of the devices 1 and 4 for the step A are 0.5 and 0.54, respectively. Accordingly, the device 1 is the first candidate, and the device 4 is the second candidate. After Step S12, it proceeds to S13.

TABLE 8

Number of Processed Lots

| Device\Step | A | B | C | D |
|---|---|---|---|---|
| 1 | 2 | N/A | N/A | 3 |
| 2 | 0 | 5 | 1 | 0 |
| 3 | N/A | N/A | N/A | 2 |
| 4 | 6 | N/A | 4 | N/A |

In Step S13, it is determined if the manufacturing device which is a candidate (in this case, the device 1) can be immediately used, i.e. if the device is not used for processing another lot. If the device can be used, it proceeds to Step S14, and if not, the device 4 which has the second highest priority, and if not the device 4, then the device 2, is set as the candidate. If no device is available, it returns to Step S11.

In Step S14, a designation of a manufacturing device for the items in process (in this case, the device 1) is outputted to the corresponding terminal device from MES. A worker sets items in process of the lot corresponds to the manufacturing device as displayed by the terminal device. According to this procedure, a process of the step for the lot (in this case, the step A) is started. Once the process of the step with the manufacturing device is completed, information of the completion of the process is transmitted from the manufacturing device to MES, and then it proceeds to Step S15.

In Step S15, based on the information of completion of the process, which is sent from the manufacturing device, the number of processed lot in Table 8 is updated. In the above-described case, 1 is added to the number of lots processed by the step A with the device 1, so the number is updated from 2 to 3. After Step S15, it proceeds to S16.

In Step 16, it is determined if all the lots scheduled to be processed are processed. If there is still unprocessed lot, it returns to Step S11. If all the lots are processed, the manufacturing execution management is completed.

Here, the flowchart of FIG. 1 only shows a series of sequence for simple explanation, and differs from actual flow of the process, in which a plurality of devices simultaneously process each step. For example, once a process of specified step is started with a manufacturing device in Step S14, it does not stay in Step S14 until it completes the process, but shifts to a condition waiting for interruption, and it returns to Step S15 when the process is completed.

As described above, in the manufacturing step managing method of this embodiment, the priority number of manufacturing device to be used for the step to process the items in process is calculated, based on the processing time of each device for each step, the number of processible processes of each device, the number of usable devices for each step, and the device load. Then, according to the calculated priority number, the manufacturing schedule management for allotting the number of lots scheduled to be processed in a certain period to each device is performed. In the actual production stage, the manufacturing execution management for preferentially process a lot by a device having the smallest process accomplishment rate is performed. According to this method, the operating rate of manufacturing device can be improved, and the manufacturing time can be shortened.

In the embodiment 1, the manufacturing step management for a manufacturing device is described, but similar managing method can be applied to a carrier device in a factory, or can be applied for managing workers when the processes are manually performed by workers.

In addition, the equation for recalculating the priority number is an empirical equation for allotting loads to each device, in which the priority number of device that has larger device load due to allotment of load is lowered. Therefore, the following equation, Eq. 4, can be used in place of Eq. 3. According to Eq. 4, the priority number will be dramatically lowered once the device load exceeds 90%.

$$\text{Most updated Priority Number} = \text{Processing Time} \times \text{Number of Processible Steps} \times \text{Number of Usable Devices} \times \{10^{k' x(\text{Device Load}-0.9)} \times 10 + 1\} \quad \text{(Eq. 4)}$$

Where, k' is generally a constant between 1 and 10, but practically between 3 and 5.

The present invention can be applied not only to production of semiconductor device, but applied to various manufacturing industry.

What is claimed is:

1. A method of managing a manufacturing process, in which a device is successively selected from a plurality of devices that can perform at least one process step, comprising:

a first step for calculating a processing time required to process one lot for each step that can be processed with a manufacturing device;

a second step for calculating the number of steps that can be processed with each manufacturing device, and the number of devices that can be used by each step;

a third step for calculating a priority number for every combination of a manufacturing device and a step based on said processing time, said number of steps that can be processed and said number of devices that can be used;

a fourth step for successively allotting one of lots scheduled to be processed to a manufacturing device that has a highest priority in a most updated order of priority, based on the number of lots to be processed by each step in a specified period;

a fifth step for calculating a device load of said manufacturing device to which said lot to be processed is allotted in said fourth step;

a sixth step for updating an order of priority by correcting said priority number calculated in said third step according to said device load calculated in said fifth step;

a seventh step for determining the number of lots to be processed by each step with each manufacturing device when all the lots to be processed are allotted to corresponding manufacturing devices; and an eighth step for directing execution of a step to process an existing lot that can be processed by said step by successively selecting a manufacturing device that has a smallest accomplishment rate, which is a ratio of the number of processed lots to the number of lots scheduled to be processed by said step with said manufacturing device.

2. The method of claim 1, wherein calculation of said priority number in said third step is performed using the following equation, $$\text{priority number} = \text{processing time} \times \text{number of processible steps} \times \text{number of usable devices},$$

wherein a lower priority number means a higher priority.

3. The method of claim 2, wherein updating said order of priority in said sixth step is performed by the following equation, $$\text{most updated priority number} = \text{processing time} \times \text{number of processible steps} \times \text{number of usable devices} \times \{(\text{device load} \times 10)^k + 1\},$$

wherein k is a constant, and a smaller priority number means a higher priority.

4. The method of claim 2, wherein updating said order of priority in said sixth step is performed by the following equation, $$\text{most updated priority number} = \text{processing time} \times \text{the number of processible steps} \times \text{the number of usable devices} \times \{10^{k' x(\text{device load}-0.9)} \times 10 + 1\},$$

where k' is a constant, and a smaller priority number means a higher priority.

* * * * *